US010496080B2

(12) United States Patent
Daniel et al.

(10) Patent No.: US 10,496,080 B2
(45) Date of Patent: Dec. 3, 2019

(54) WELDING JOB SEQUENCER

(71) Applicant: Lincoln Global, Inc., City of Industry, CA (US)

(72) Inventors: Joseph A. Daniel, Sagamore Hills, OH (US); Dmitry Brant, University Heights, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 658 days.

(21) Appl. No.: 14/730,991

(22) Filed: Jun. 4, 2015

(65) Prior Publication Data

US 2015/0268663 A1 Sep. 24, 2015

Related U.S. Application Data

(63) Continuation of application No. 11/613,652, filed on Dec. 20, 2006, now Pat. No. 9,104,195.

(51) Int. Cl.
*B23K 9/10* (2006.01)
*G05B 19/418* (2006.01)
*B23K 9/095* (2006.01)
*B23K 31/12* (2006.01)

(52) U.S. Cl.
CPC ...... *G05B 19/41865* (2013.01); *B23K 9/0953* (2013.01); *B23K 31/125* (2013.01); *G05B 2219/32001* (2013.01); *G05B 2219/32007* (2013.01); *G05B 2219/45135* (2013.01); *Y02P 90/04* (2015.11); *Y02P 90/10* (2015.11); *Y02P 90/20* (2015.11); *Y02P 90/22* (2015.11)

(58) Field of Classification Search
CPC ....... B23K 9/10; B23K 9/1056; B23K 9/1062

USPC ... 219/130.1, 130.21, 130.22, 130.51, 130.5, 219/137.7
See application file for complete search history.

(56) References Cited

U.S. PATENT DOCUMENTS

| 1,159,119 | A | 11/1915 | Springer |
| D140,630 | S | 9/1945 | Garibay |
| D142,377 | S | 9/1945 | Dunn |
| 2,681,969 | A | 6/1954 | Burke |
| D152,049 | S | 3/1955 | Alanson |

(Continued)

FOREIGN PATENT DOCUMENTS

| CA | 2698078 A1 | 9/2011 |
| CH | 688034 A5 | 4/1997 |

(Continued)

OTHER PUBLICATIONS

Australian Patent Application No. 2007338858, Office Action, 2 pages, dated Aug. 13, 2010.

(Continued)

*Primary Examiner* — Dana Ross
*Assistant Examiner* — Ayub A Maye
(74) *Attorney, Agent, or Firm* — Calfee, Halter & Griswold LLP

(57) ABSTRACT

A semi-automatic welding work cell, including a welding job sequencer that automatically selects a welding schedule for use by an operator in the semi-automatic welding work cell. The automatic selection may be by way of elapsed time, a detection of welding operations, a detection of the amount of welding wire supplied for the welding operation, or a detection of the amount of energy supplied for the welding operation.

37 Claims, 2 Drawing Sheets

(56) References Cited

U.S. PATENT DOCUMENTS

| | | |
|---|---|---|
| 2,728,838 A | 12/1955 | Barnes |
| D174,208 S | 2/1956 | Abildgaard |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,581,051 A | 5/1971 | Brown |
| 3,621,177 A | 11/1971 | McPherson et al. |
| 3,654,421 A | 4/1972 | Streetman et al. |
| 3,689,734 A | 9/1972 | Burley et al. |
| 3,739,140 A | 6/1973 | Rotilio |
| 3,847,584 A * | 11/1974 | Houser ............... C03B 23/245 65/152 |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D176,942 S | 2/1977 | Cross |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,104,724 A | 8/1978 | Dix et al. |
| 4,124,944 A | 11/1978 | Blair |
| 4,132,014 A | 1/1979 | Schow |
| 4,145,593 A | 3/1979 | Merrick et al. |
| 4,153,913 A | 5/1979 | Swift |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,324,973 A | 4/1982 | Kirwan et al. |
| 4,359,622 A | 11/1982 | Dostoomian et al. |
| 4,375,026 A | 2/1983 | Kearney |
| 4,380,696 A | 4/1983 | Masaki |
| 4,390,954 A | 6/1983 | Manning |
| 4,410,787 A | 10/1983 | Kremers et al. |
| 4,419,560 A | 12/1983 | Zurek |
| 4,419,562 A | 12/1983 | Jon et al. |
| 4,429,266 A | 1/1984 | Tradt |
| 4,452,589 A | 6/1984 | Denison |
| D275,292 S | 8/1984 | Bouman |
| 4,477,713 A | 10/1984 | Cook et al. |
| 4,484,059 A | 11/1984 | Lillquist |
| 4,497,019 A | 1/1985 | Waber |
| D277,761 S | 2/1985 | Korovin et al. |
| 4,527,045 A * | 7/1985 | Nakajima ............ B23K 9/0953 219/130.21 |
| D280,329 S | 8/1985 | Bouman |
| 4,611,111 A | 9/1986 | Baheti et al. |
| 4,616,326 A | 10/1986 | Meier et al. |
| 4,629,860 A | 12/1986 | Lindbom |
| 4,631,700 A | 12/1986 | Lapeyre |
| 4,677,277 A | 6/1987 | Cook et al. |
| 4,680,014 A | 7/1987 | Paton et al. |
| 4,681,999 A | 7/1987 | Hruska |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,785,159 A | 11/1988 | Hruska |
| 4,867,685 A | 9/1989 | Brush et al. |
| 4,877,940 A | 10/1989 | Bangs et al. |
| 4,881,678 A * | 11/1989 | Gaudin ............... B23K 9/1087 219/61.5 |
| 4,897,521 A | 1/1990 | Burr |
| 4,907,973 A | 3/1990 | Hon |
| 4,920,248 A | 4/1990 | Toyoda et al. |
| 4,931,018 A | 6/1990 | Herbst et al. |
| 4,998,050 A | 3/1991 | Nishiyama et al. |
| 5,034,593 A | 7/1991 | Rice et al. |
| 5,061,841 A | 10/1991 | Richardson |
| 5,081,338 A | 1/1992 | Dufrenne |
| 5,089,914 A | 2/1992 | Prescott |
| 5,192,845 A | 3/1993 | Kirmsse et al. |
| 5,206,472 A | 4/1993 | Myking et al. |
| 5,206,474 A | 4/1993 | Fukuoka et al. |
| 5,265,787 A | 11/1993 | Ishizaka et al. |
| 5,266,930 A | 11/1993 | Ichikawa et al. |
| 5,278,390 A | 1/1994 | Blankenship |
| 5,285,916 A | 2/1994 | Ross |
| 5,305,183 A | 4/1994 | Teynor |
| 5,306,893 A | 4/1994 | Morris et al. |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,380,978 A | 1/1995 | Pryor |
| D359,296 S | 6/1995 | Witherspoon |
| 5,424,634 A | 6/1995 | Goldfarb et al. |
| 5,436,638 A | 7/1995 | Bolas et al. |
| 5,449,877 A | 9/1995 | Buda et al. |
| 5,450,315 A | 9/1995 | Stefanski |
| 5,464,957 A | 11/1995 | Kidwell et al. |
| 5,467,957 A | 11/1995 | Gauger |
| D365,583 S | 12/1995 | Viken |
| 5,474,225 A | 12/1995 | Geier et al. |
| 5,493,093 A | 2/1996 | Cecil |
| 5,533,206 A | 7/1996 | Petrie et al. |
| 5,562,843 A | 10/1996 | Yasumoto |
| 5,651,903 A | 7/1997 | Shirk |
| 5,670,071 A | 9/1997 | Ueyama et al. |
| 5,676,503 A | 10/1997 | Lang |
| 5,676,867 A | 10/1997 | Van Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,734,421 A | 3/1998 | Maguire, Jr. |
| 5,751,258 A | 5/1998 | Fergason et al. |
| D395,296 S | 6/1998 | Kaye et al. |
| 5,773,779 A | 6/1998 | Morlock |
| D396,238 S | 7/1998 | Schmitt |
| 5,781,258 A | 7/1998 | Dabral et al. |
| 5,823,785 A | 10/1998 | Matherne, Jr. |
| 5,835,077 A | 11/1998 | Dao et al. |
| 5,835,277 A | 11/1998 | Hegg |
| 5,837,968 A | 11/1998 | Rohrberg et al. |
| 5,845,053 A | 12/1998 | Watanabe et al. |
| 5,850,066 A | 12/1998 | Dew et al. |
| 5,859,847 A | 1/1999 | Dew et al. |
| 5,866,866 A | 2/1999 | Shimada |
| 5,877,468 A | 3/1999 | Morlock |
| 5,910,894 A | 6/1999 | Pryor |
| 5,949,388 A | 9/1999 | Atsumi et al. |
| 5,963,891 A | 10/1999 | Walker et al. |
| 6,002,104 A | 12/1999 | Hsu |
| 6,008,470 A | 12/1999 | Zhang et al. |
| 6,023,044 A | 2/2000 | Kosaka et al. |
| 6,049,059 A | 4/2000 | Kim |
| 6,051,805 A | 4/2000 | Vaidya et al. |
| 6,063,458 A | 5/2000 | Robertson et al. |
| 6,087,627 A | 7/2000 | Kramer |
| 6,114,645 A | 9/2000 | Burgess |
| 6,115,273 A | 9/2000 | Geissler |
| RE36,926 E | 10/2000 | Austin |
| 6,133,545 A | 10/2000 | Okazaki et al. |
| 6,151,640 A | 11/2000 | Buda et al. |
| 6,155,475 A | 12/2000 | Ekelof et al. |
| 6,155,928 A | 12/2000 | Burdick |
| 6,167,328 A | 12/2000 | Takaoka et al. |
| 6,230,327 B1 | 5/2001 | Briand et al. |
| 6,236,013 B1 | 5/2001 | Delzenne |
| 6,236,017 B1 | 5/2001 | Smartt |
| 6,242,711 B1 | 6/2001 | Cooper |
| 6,271,500 B1 | 8/2001 | Hirayama et al. |
| 6,278,074 B1 | 8/2001 | Morlock et al. |
| 6,292,715 B1 | 9/2001 | Rongo |
| 6,330,938 B1 | 12/2001 | Hervé et al. |
| 6,330,966 B1 | 12/2001 | Eissfeller |
| 6,331,848 B1 | 12/2001 | Stove et al. |
| D456,428 S | 4/2002 | Aronson, II et al. |

(56) References Cited

U.S. PATENT DOCUMENTS

| | | | |
|---|---|---|---|
| 6,373,465 B2 | 4/2002 | Jolly et al. |
| D456,828 S | 5/2002 | Aronson, II et al. |
| 6,399,912 B1 | 6/2002 | Steenis et al. |
| D461,383 S | 8/2002 | Blackburn |
| 6,441,342 B1 | 8/2002 | Hsu |
| 6,444,942 B1 | 9/2002 | Kawai et al. |
| 6,445,964 B1 | 9/2002 | White et al. |
| 6,492,618 B1* | 12/2002 | Flood | B23K 9/0286 |
| | | | 219/125.11 |
| 6,506,997 B2 | 1/2003 | Matsuyama |
| 6,548,783 B1 | 4/2003 | Kilovsky et al. |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,621,049 B2 | 9/2003 | Suzuki |
| 6,624,388 B1 | 9/2003 | Blankenship et al. |
| 6,636,776 B1 | 10/2003 | Barton et al. |
| D482,171 S | 11/2003 | Vui et al. |
| 6,644,645 B2 | 11/2003 | Bakodledis |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,700,097 B1 | 3/2004 | Hsu et al. |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| 6,717,108 B2 | 4/2004 | Hsu |
| D490,347 S | 5/2004 | Meyers |
| 6,730,875 B2 | 5/2004 | Hsu |
| 6,734,393 B1 | 5/2004 | Friedl et al. |
| 6,734,394 B2 | 5/2004 | Hsu |
| 6,744,011 B1 | 6/2004 | Hu et al. |
| 6,747,247 B2 | 6/2004 | Holverson et al. |
| 6,750,428 B2 | 6/2004 | Okamoto et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,822,195 B2 | 11/2004 | Kanodia et al. |
| 6,847,922 B1* | 1/2005 | Wampler, II | G05B 19/4069 |
| | | | 700/251 |
| 6,847,956 B2 | 1/2005 | Manicke et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,912,447 B2 | 6/2005 | Klimko et al. |
| 6,920,371 B2 | 7/2005 | Hillen et al. |
| 6,924,459 B2 | 8/2005 | Spear et al. |
| 6,930,280 B2 | 8/2005 | Zauner et al. |
| 6,940,039 B2 | 9/2005 | Blankenship et al. |
| 7,021,937 B2 | 4/2006 | Simpson et al. |
| 7,028,882 B2 | 4/2006 | Kilovsky et al. |
| 7,030,334 B1 | 4/2006 | Ruiz et al. |
| 7,032,814 B2 | 4/2006 | Blankenship |
| 7,072,774 B1 | 7/2006 | Houston |
| 7,102,098 B2 | 9/2006 | Rouault et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,247,814 B2 | 7/2007 | Ott |
| D555,446 S | 11/2007 | Picaza Ibarrondo |
| 7,315,241 B1 | 1/2008 | Daily et al. |
| D561,973 S | 2/2008 | Kinsley et al. |
| 7,353,715 B2 | 4/2008 | Myers |
| 7,358,458 B2 | 4/2008 | Daniel |
| 7,363,137 B2 | 4/2008 | Brant et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,478,108 B2 | 1/2009 | Townsend et al. |
| D587,975 S | 3/2009 | Aronson, II et al. |
| 7,515,972 B2 | 4/2009 | Kumar et al. |
| 7,516,022 B2 | 4/2009 | Lee et al. |
| 7,523,069 B1 | 4/2009 | Friedl |
| 7,534,005 B1 | 5/2009 | Buckman |
| 7,539,603 B2 | 5/2009 | Subrahmanyam |
| 7,575,304 B2 | 8/2009 | Sugahara |
| D602,057 S | 10/2009 | Osicki |
| 7,603,191 B2 | 10/2009 | Gross |
| 7,617,017 B2 | 11/2009 | Menassa et al. |
| 7,621,171 B2 | 11/2009 | O'Brien |
| D606,102 S | 12/2009 | Bender et al. |
| 7,642,486 B2 | 1/2010 | Fosbinde et al. |
| 7,643,890 B1 | 1/2010 | Hillen et al. |
| 7,643,907 B2 | 1/2010 | Fuhlbrigge et al. |
| 7,687,741 B2 | 3/2010 | Kainec et al. |
| D614,217 S | 4/2010 | Peters et al. |
| D615,573 S | 5/2010 | Peters et al. |
| 7,772,524 B2 | 8/2010 | Hillen et al. |
| 7,809,534 B2 | 10/2010 | Sturrock et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,962,967 B2 | 6/2011 | Becker et al. |
| 7,970,172 B1 | 6/2011 | Hendrickson |
| 7,972,129 B2 | 7/2011 | O'Donoghue |
| 7,991,587 B2 | 8/2011 | Ihn |
| 8,049,139 B2 | 11/2011 | Houston |
| 8,069,017 B2 | 11/2011 | Hallquist |
| 8,115,138 B2 | 2/2012 | Jacovetty et al. |
| 8,224,881 B1 | 7/2012 | Spear |
| 8,248,324 B2 | 8/2012 | Nangle |
| 3,265,886 A1 | 9/2012 | Bisiaux et al. |
| 3,274,013 A1 | 9/2012 | Wallace |
| 8,287,522 B2 | 10/2012 | Moses et al. |
| 3,312,060 A1 | 11/2012 | Gilbert et al. |
| 8,316,462 B2 | 11/2012 | Becker et al. |
| 8,322,591 B2 | 12/2012 | Diez et al. |
| 8,363,048 B2 | 1/2013 | Gering |
| 8,365,603 B2 | 2/2013 | Lesage et al. |
| 3,502,866 A1 | 8/2013 | Becker et al. |
| 8,512,043 B2 | 8/2013 | Choquet |
| 8,569,646 B2 | 10/2013 | Daniel et al. |
| 8,569,655 B2 | 10/2013 | Cole |
| 8,592,723 B2 | 11/2013 | Davidson et al. |
| 8,777,629 B2 | 7/2014 | Kreindl et al. |
| RE45,062 E | 8/2014 | Maguire, Jr. |
| 8,860,760 B2 | 10/2014 | Chen et al. |
| 8,884,177 B2 | 11/2014 | Daniel et al. |
| 9,089,921 B2 | 7/2015 | Daniel et al. |
| 9,104,195 B2 | 8/2015 | Daniel et al. |
| 9,323,056 B2 | 4/2016 | Williams |
| 9,937,577 B2 | 4/2018 | Daniel et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen et al. |
| 2002/0050984 A1 | 5/2002 | Roberts |
| 2002/0085843 A1 | 7/2002 | Mann |
| 2002/0107825 A1 | 8/2002 | Manicke et al. |
| 2002/0117487 A1 | 8/2002 | Corby, Jr. et al. |
| 2002/0175897 A1 | 11/2002 | Pelosi |
| 2003/0000931 A1 | 1/2003 | Ueda et al. |
| 2003/0023592 A1 | 1/2003 | Modica et al. |
| 2003/0025884 A1 | 2/2003 | Hamana et al. |
| 2003/0106787 A1 | 6/2003 | Santini |
| 2003/0111451 A1 | 6/2003 | Blankenship et al. |
| 2003/0165180 A1 | 9/2003 | Weerasinghe et al. |
| 2003/0172032 A1 | 9/2003 | Choquet |
| 2003/0234885 A1 | 12/2003 | Pilu |
| 2004/0008157 A1 | 1/2004 | Brubaker et al. |
| 2004/0020907 A1 | 2/2004 | Zauner et al. |

(56) References Cited

U.S. PATENT DOCUMENTS

| | | |
|---|---|---|
| 2004/0035990 A1 | 2/2004 | Ackeret |
| 2004/0050824 A1 | 3/2004 | Samler |
| 2004/0122550 A1 | 6/2004 | Klimko et al. |
| 2004/0140301 A1 | 7/2004 | Blankenship et al. |
| 2004/0232128 A1 | 11/2004 | Niedereder et al. |
| 2004/0245227 A1 | 12/2004 | Grafton-Reed et al. |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0127052 A1 | 6/2005 | Spencer |
| 2005/0128186 A1 | 6/2005 | Shahoian et al. |
| 2005/0133488 A1 | 6/2005 | Blankenship et al. |
| 2005/0149210 A1 | 7/2005 | Britton |
| 2005/0159840 A1 | 7/2005 | Lin et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu et al. |
| 2005/0275913 A1 | 12/2005 | Vesely et al. |
| 2005/0275914 A1 | 12/2005 | Vesely et al. |
| 2006/0010551 A1 | 1/2006 | Bishop et al. |
| 2006/0014130 A1 | 1/2006 | Weinstein |
| 2006/0070987 A1 | 4/2006 | Daniel |
| 2006/0131291 A1 | 6/2006 | Kaufman |
| 2006/0136183 A1 | 6/2006 | Choquet |
| 2006/0163227 A1 | 7/2006 | Hillen et al. |
| 2006/0163230 A1 | 7/2006 | Kaufman |
| 2006/0169682 A1 | 8/2006 | Kainec et al. |
| 2006/0173619 A1 | 8/2006 | Brant et al. |
| 2006/0178778 A1 | 8/2006 | Fuhlbrigge et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0252543 A1 | 11/2006 | Van Noland et al. |
| 2006/0258447 A1 | 11/2006 | Baszucki et al. |
| 2007/0034611 A1 | 2/2007 | Dirus et al. |
| 2007/0038400 A1 | 2/2007 | Lee et al. |
| 2007/0039937 A1 | 2/2007 | Jang et al. |
| 2007/0045488 A1 | 3/2007 | Shin |
| 2007/0056942 A1 | 3/2007 | Daniel et al. |
| 2007/0080153 A1 | 4/2007 | Albrecht |
| 2007/0088536 A1 | 4/2007 | Ishikawa |
| 2007/0112889 A1 | 5/2007 | Cook et al. |
| 2007/0198105 A1 | 8/2007 | Britton |
| 2007/0198117 A1 | 8/2007 | Wajihuddin |
| 2007/0211026 A1 | 9/2007 | Ohta |
| 2007/0221797 A1 | 9/2007 | Thompson et al. |
| 2007/0256503 A1 | 11/2007 | Wong et al. |
| 2007/0262065 A1 | 11/2007 | Daniel et al. |
| 2007/0277611 A1 | 12/2007 | Portzgen et al. |
| 2007/0291035 A1 | 12/2007 | Vesely et al. |
| 2008/0031774 A1 | 2/2008 | Magnant et al. |
| 2008/0038702 A1 | 2/2008 | Choquet |
| 2008/0078811 A1 | 4/2008 | Hillen et al. |
| 2008/0078812 A1 | 4/2008 | Peters et al. |
| 2008/0117203 A1 | 5/2008 | Gering |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0158502 A1 | 7/2008 | Becker |
| 2008/0169277 A1 | 7/2008 | Achtner et al. |
| 2008/0203075 A1 | 8/2008 | Feldhausen et al. |
| 2008/0233550 A1 | 9/2008 | Solomon |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0057286 A1 | 3/2009 | Ihara et al. |
| 2009/0094721 A1 | 4/2009 | Becker |
| 2009/0107969 A1 | 4/2009 | Asai |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0259444 A1 | 10/2009 | Dolansky et al. |
| 2009/0277893 A1 | 11/2009 | Spellman |
| 2009/0298024 A1 | 12/2009 | Batzler |
| 2009/0313549 A1 | 12/2009 | Casner |
| 2009/0325699 A1 | 12/2009 | Delgiannidis |
| 2010/0012017 A1 | 1/2010 | Miller |
| 2010/0012625 A1* | 1/2010 | Silk .............. B23K 9/164 219/59.1 |
| 2010/0012637 A1 | 1/2010 | Jaeger |
| 2010/0048273 A1 | 2/2010 | Wallace et al. |
| 2010/0062405 A1 | 3/2010 | Zboray |
| 2010/0062406 A1 | 3/2010 | Zboray et al. |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0169053 A1 | 7/2010 | Martis et al. |
| 2010/0176107 A1 | 7/2010 | Bong |
| 2010/0201803 A1 | 8/2010 | Melikian |
| 2010/0217440 A1 | 8/2010 | Lindell |
| 2010/0224610 A1 | 9/2010 | Wallace |
| 2010/0262468 A1 | 10/2010 | Blankenship |
| 2010/0276396 A1 | 11/2010 | Cooper et al. |
| 2010/0299101 A1 | 11/2010 | Shimada et al. |
| 2010/0307249 A1 | 12/2010 | Lesage et al. |
| 2011/0006047 A1 | 1/2011 | Penrod et al. |
| 2011/0009985 A1 | 1/2011 | Nixon et al. |
| 2011/0060568 A1 | 3/2011 | Goldfine et al. |
| 2011/0083241 A1 | 4/2011 | Cole |
| 2011/0091846 A1 | 4/2011 | Kreindl et al. |
| 2011/0114615 A1 | 5/2011 | Daniel et al. |
| 2011/0116076 A1 | 5/2011 | Chanty et al. |
| 2011/0117527 A1 | 5/2011 | Conrardy et al. |
| 2011/0120978 A1 | 5/2011 | Takahashi et al. |
| 2011/0122495 A1 | 5/2011 | Togashi |
| 2011/0172796 A1 | 7/2011 | Sohmshetty et al. |
| 2011/0183304 A1 | 7/2011 | Wallace et al. |
| 2011/0198329 A1 | 8/2011 | Davidson et al. |
| 2011/0246395 A1 | 10/2011 | Dolson et al. |
| 2011/0248864 A1 | 10/2011 | Becker et al. |
| 2011/0255259 A1 | 10/2011 | Weber et al. |
| 2011/0290765 A1 | 12/2011 | Albrecht et al. |
| 2011/0316516 A1 | 12/2011 | Schiefermüller et al. |
| 2012/0081564 A1 | 4/2012 | Kamiya |
| 2012/0095941 A1 | 4/2012 | Dolson et al. |
| 2012/0122062 A1 | 5/2012 | Yang |
| 2012/0145689 A1 | 6/2012 | Hillen et al. |
| 2012/0189993 A1 | 7/2012 | Kindig et al. |
| 2012/0291172 A1 | 11/2012 | Wills et al. |
| 2012/0298640 A1 | 11/2012 | Conrardy et al. |
| 2012/0325792 A1 | 12/2012 | Stein et al. |
| 2013/0008003 A1 | 1/2013 | Izutani et al. |
| 2013/0015169 A1 | 1/2013 | Marschke et al. |
| 2013/0026150 A1 | 1/2013 | Chanty et al. |
| 2013/0040270 A1 | 2/2013 | Albrecht |
| 2013/0075380 A1 | 3/2013 | Albrech et al. |
| 2013/0119037 A1 | 5/2013 | Daniel |
| 2013/0189657 A1 | 7/2013 | Wallace et al. |
| 2013/0189658 A1 | 7/2013 | Peters et al. |
| 2013/0206741 A1 | 8/2013 | Pfeifer et al. |
| 2013/0230832 A1 | 9/2013 | Peters et al. |
| 2013/0242110 A1 | 9/2013 | Terre et al. |
| 2013/0264319 A1 | 10/2013 | Temby |
| 2013/0277344 A1 | 10/2013 | Guymon |
| 2013/0282182 A1 | 10/2013 | Hideg |
| 2013/0291271 A1 | 11/2013 | Becker et al. |
| 2014/0021184 A1 | 1/2014 | Daniel |
| 2014/0027422 A1 | 1/2014 | Panelli |
| 2014/0038143 A1 | 2/2014 | Daniel et al. |
| 2014/0042135 A1 | 2/2014 | Daniel et al. |

(56) References Cited

U.S. PATENT DOCUMENTS

| | | | |
|---|---|---|---|
| 2014/0042136 A1 | 2/2014 | Daniel et al. |
| 2014/0042137 A1 | 2/2014 | Daniel et al. |
| 2014/0134579 A1 | 5/2014 | Becker |
| 2014/0134580 A1 | 5/2014 | Becker |
| 2014/0263224 A1 | 9/2014 | Becker |
| 2014/0263225 A1 | 9/2014 | Daniel et al. |
| 2014/0263226 A1 | 9/2014 | Daniel et al. |
| 2014/0272836 A1 | 9/2014 | Becker |
| 2014/0272837 A1 | 9/2014 | Becker |
| 2014/0272838 A1 | 9/2014 | Becker |
| 2014/0346158 A1 | 11/2014 | Matthews |
| 2015/0056584 A1 | 2/2015 | Boulware et al. |
| 2015/0056585 A1 | 2/2015 | Boulware et al. |
| 2015/0056586 A1 | 2/2015 | Penrod et al. |
| 2015/0234189 A1 | 8/2015 | Lyons |
| 2015/0268473 A1 | 9/2015 | Yjima et al. |
| 2016/0165220 A1 | 6/2016 | Fujimaki et al. |
| 2016/0188277 A1 | 6/2016 | Miyasaka et al. |
| 2016/0260261 A1 | 9/2016 | Hsu |
| 2016/0331592 A1 | 11/2016 | Stewart |
| 2016/0361774 A9 | 12/2016 | Daniel et al. |
| 2017/0045337 A1 | 2/2017 | Kim |

FOREIGN PATENT DOCUMENTS

| | | |
|---|---|---|
| CN | 1370654 A | 9/2002 |
| CN | 1469791 A | 1/2004 |
| CN | 101209512 A | 7/2008 |
| CN | 101214178 A | 7/2008 |
| CN | 201083660 Y | 7/2008 |
| CN | 201229711 Y | 4/2009 |
| CN | 101571887 A | 11/2009 |
| CN | 101600532 A | 12/2009 |
| CN | 101419755 B | 8/2010 |
| CN | 101587659 B | 2/2011 |
| CN | 20219978 U | 4/2012 |
| CN | 102573720 A | 7/2012 |
| CN | 102596476 A | 7/2012 |
| CN | 103871279 A | 6/2014 |
| CN | 105209994 A | 12/2015 |
| CN | 105229545 | 1/2016 |
| CN | 106270941 A | 1/2017 |
| DE | 2833638 A1 | 2/1980 |
| DE | 3046634 C2 | 1/1983 |
| DE | 3244307 A1 | 5/1984 |
| DE | 3522581 A1 | 1/1987 |
| DE | 1037879 A1 | 6/1991 |
| DE | 19615069 A1 | 10/1997 |
| DE | 19739720 C1 | 10/1998 |
| DE | 19834205 A1 | 2/2000 |
| DE | 20009543 U1 | 8/2001 |
| DE | 102005047204 A1 | 4/2007 |
| DE | 102010023663 A1 | 12/2011 |
| DE | 102010038902 B4 | 2/2012 |
| DE | 202012013151 U1 | 2/2015 |
| EP | 0127299 A1 | 12/1984 |
| EP | 0145891 A1 | 6/1985 |
| EP | 108599 B1 | 12/1988 |
| EP | 319623 A1 | 6/1989 |
| EP | 0852986 A1 | 7/1998 |
| EP | 1078707 A1 | 2/2001 |
| EP | 1170649 A1 | 1/2002 |
| EP | 1700667 A1 | 9/2006 |
| EP | 1702707 A1 | 9/2006 |
| EP | 1724676 A1 | 11/2006 |
| EP | 1750185 A2 | 2/2007 |
| EP | 1527852 B1 | 3/2008 |
| EP | 1905533 A2 | 4/2008 |
| EP | 1905533 B1 | 11/2013 |
| ES | 2274736 B1 | 3/2008 |
| FR | 1456780 A | 7/1966 |
| FR | 2827066 B1 | 4/2005 |
| FR | 2926660 B1 | 6/2011 |
| GB | 1455972 A | 11/1976 |
| GB | 1511608 A | 5/1978 |
| GB | 2254172 B | 12/1992 |
| GB | 2435838 A | 9/2007 |
| GB | 2454232 B | 4/2012 |
| JP | 02224877 A | 9/1990 |
| JP | 03005083 A | 1/1991 |
| JP | 05329645 A | 12/1993 |
| JP | 07047471 A | 2/1995 |
| JP | 07232270 A | 9/1995 |
| JP | 08132274 A | 5/1996 |
| JP | 08150476 A | 6/1996 |
| JP | 08505091 A | 6/1996 |
| JP | 2000167666 A | 6/2000 |
| JP | 2001071140 A | 3/2001 |
| JP | 2001290518 A | 10/2001 |
| JP | 2002278670 A | 9/2002 |
| JP | 2003200372 A | 7/2003 |
| JP | 2003326362 A | 11/2003 |
| JP | 2006006604 A | 1/2006 |
| JP | 2006281270 A | 10/2006 |
| JP | 2007290025 A | 11/2007 |
| JP | 2009500178 A | 1/2009 |
| JP | 2009160636 A | 7/2009 |
| JP | 2010075954 A | 4/2010 |
| JP | 2011070539 A | 4/2011 |
| JP | 2012024867 A | 2/2012 |
| KR | 20090010693 A | 1/2009 |
| RU | 2008108601 A | 9/2009 |
| SU | 1038963 A1 | 8/1983 |
| WO | 9845078 A1 | 10/1998 |
| WO | 01012376 A1 | 2/2001 |
| WO | 0143910 A1 | 6/2001 |
| WO | 01058400 A1 | 8/2001 |
| WO | 2002086656 A2 | 10/2002 |
| WO | 2005084867 | 9/2005 |
| WO | 2005102230 A1 | 11/2005 |
| WO | 2006034571 A1 | 4/2006 |
| WO | 2007009131 A1 | 1/2007 |
| WO | 2007039278 A1 | 4/2007 |
| WO | 2008031052 | 3/2008 |
| WO | 2008031052 A2 | 3/2008 |
| WO | 2008079165 A1 | 7/2008 |
| WO | 2009060231 A1 | 5/2009 |
| WO | 2009120921 A1 | 10/2009 |
| WO | 2009149740 A1 | 12/2009 |
| WO | 2010000003 A2 | 1/2010 |
| WO | 2010044982 A1 | 4/2010 |
| WO | 2010091493 A1 | 8/2010 |
| WO | 2010142858 A1 | 12/2010 |
| WO | 2011045657 A1 | 4/2011 |
| WO | 2011058433 A1 | 5/2011 |
| WO | 2011067447 A1 | 6/2011 |
| WO | 2011100214 A1 | 8/2011 |
| WO | 2012004491 | 1/2012 |
| WO | 2011097035 A3 | 2/2012 |
| WO | 2012082105 A1 | 6/2012 |
| WO | 2012143327 A1 | 10/2012 |
| WO | 2013014202 A1 | 1/2013 |
| WO | 2013114189 A1 | 8/2013 |
| WO | 2013160745 A1 | 10/2013 |
| WO | 2013175079 A1 | 11/2013 |
| WO | 2014007830 A1 | 1/2014 |
| WO | 2014019045 A1 | 2/2014 |
| WO | 2014020386 A1 | 2/2014 |
| WO | 2014140738 A2 | 9/2014 |
| WO | 2014140743 A1 | 9/2014 |
| WO | 2014140746 A2 | 9/2014 |
| WO | 2014140747 A2 | 9/2014 |
| WO | 2014140749 A1 | 9/2014 |
| WO | 2014140766 A1 | 9/2014 |

OTHER PUBLICATIONS

Canadian Patent Application No. 2,672,717, Office Action, 3 pages, dated Mar. 21, 2013.
Canadian Patent Application No. 2,672,717, Office Action, 5 pages, dated Sep. 2, 2010.
Chinese Patent Application No. 200780046777.X, Office Action, 4 pages, dated Jul. 3, 2012.

(56) References Cited

OTHER PUBLICATIONS

Chinese Patent Application No. 200780046777.X, Office Action, 4 pages, dated Jul. 30, 2013.
Chinese Patent Application No. 200780046777.X, Office Action, 5 pages, dated Feb. 1, 2013.
Chinese Patent Application No. 200780046777.X, Office Action, 5 pages, dated Jan. 15, 2014.
Chinese Patent Application No. 200780046777.X, Office Action, 8 pages, dated Aug. 14, 2014.
Chinese Patent Application No. 200780046777.X, Office Action, 8 pages, dated Jul. 20, 2011.
International Application No. PCT/US2007/15014, International Search Report & Written Opinion, 5 pages, dated Mar. 11, 2008.
The Lincoln Electric Company, Product Brochure for "NA-3 and NA-4 Automatic Welding Systems With Solid State Control," Publication No. E9.10, 8 pages, May 1994.
The Lincoln Electric Company, Product Brochure for "NA-5 Automatic Welding System," Publication No. E9.30, 8 pages, Nov. 1999.
The Lincoln Electric Company, Product Brochure for "Power Feed 10M," Publication No. E8.266, 4 pages, Aug. 2004.
The Lincoln Electric Company, Product Brochure for Power Wave 455M & 455M/Stt, Publication No. E5/161, 8 pages, Aug. 2004.
The Lincoln Electric Company, Product Brochure for "Waveform Control Technology," Publication No. NX-1.10, 8 pages, Nov. 2003.
U.S. Patent and Trademark Office, Interim Guide For Determining Subject Matter Eligibility For Process Claims In View Of *Bilski* v. *Kappos*, Federal Register, vol. 75, No. 143, 7 pages, Jul. 27, 2010.
U.S. Appl. No. 11/227,349, filed Mar. 2, 2011.
International Search Report and Written Opinion for PCT/IB2014/000313, Applicant: Lincoln Global, Inc., dated Sep. 24, 2015, 12 pages.
International Search Report and Written Opinion for PCT/IB2014/000319, Applicant: Lincoln Global, Inc., dated Sep. 24, 2015, 12 pages.
International Search Report and Written Opinion for PCT/IB2014/000323, Applicant: Lincoln Global, Inc., dated Sep. 24, 2015, 12 pages.
International Search Report and Written Opinion for PCT/IB2014/000324, Applicant: Lincoln Global, Inc., dated Sep. 24, 2015, 12 pages.
International Search Report and Written Opinion for PCT/IB2014/000326, Applicant: Lincoln Global, Inc., dated Sep. 24, 2015, 12 pages.
International Search Report and Written Opinion for PCT/IB2014/000350, Applicant: Lincoln Global, Inc., dated Sep. 24, 2015, 12 pages.
International Search Report for PCT/2007/015014, dated Sep. 22, 2015, 6 pages.
Florian Echtler et al., "The Intelligent Welding Gun: Augmented Reality for Experimental Vehicle Construction," Virtual and Augmented Reality Applications in Manufacturing, Jan. 1, 2003, XP055052781, retrieved from the Internet: URL: http://www.springer.com, pp. 3-12.
Rubinovitz et al., "Task Level Off-Line Programming System for Robotic Arc Welding—An Overview", Journal of Manufacturing Systems, vol. 7, No. 4, Jan. 1, 1988, pp. 293-305.
International Search Report and Written Opinion for PCT/IB2014/000350, Applicant: Lincoln Global, Inc., dated Sep. 4, 2014, 13 pages.
Office Action from Chinese Patent Application No. 201480026618.3 dated Mar. 17, 2017.
Office Action from Chinese Patent Application No. 201480027935 dated Mar. 23, 2017.
Office Action from Chinese Application No. 201480027966.2 dated Mar. 1, 2017.
Office Action from Chinese Application No. 201480027966.2 dated Aug. 28, 2017.
Office Action from Chinese Application No. 201480026559.X dated Apr. 27, 2017.
Office Action from Chinese Application No. 201610806381.1 dated Aug. 1, 2017.
U.S. Appl. No. 11/227,349, filed Sep. 15, 2005.
International Preliminary Report on Patenability from PCT/US07/15014 dated Jun. 23, 2009.
International Preliminary Report on Patenability from PCT/US15/001991 dated May 26, 2017.
Power Feed 10M, Publication E8.266, Aug. 2004 brochure.
Office Action from U.S. Appl. No. 11/613,652 dated Aug. 21, 2008.
Amendment from U.S. Appl. No. 11/613,652 dated Nov. 20, 2008.
Office Action from U.S. Appl. No. 11/613,652 dated Jun. 9, 2009.
Amendment from from U.S. Appl. No. 11/613,652 dated Sep. 9, 2009.
Office Action from U.S. Appl. No. 11/613,652 dated Jan. 25, 2010.
Amendment from U.S. Appl. No. 11/613,652 dated Jun. 11, 2010.
Office Action from U.S. Appl. No. 11/613,652 dated Aug. 17, 2011.
Amendment from U.S. Appl. No. 11/613,652 dated Dec. 19, 2011.
Office Action from U.S. Appl. No. 11/613,652 dated Feb. 20, 2014.
Amendment from U.S. Appl. No. 11/613,652 dated May 19, 2014.
Advisory Action from U.S. Appl. No. 11/613,652 dated Jun. 6, 2014.
Notice of Appeal from U.S. Appl. No. 11/613,652 dated Aug. 19, 2014.
Applicant Summary of Interview With Examiner from U.S. Appl. No. 11/613,652 dated Aug. 19, 2014.
Applicant Summary of Interview With Examiner from U.S. Appl. No. 11/613,652 dated Oct. 2, 2014.
Applicant Initiated Interview Summary from U.S. Appl. No. 11/613,652 dated Oct. 9, 2014.
Amendment from U.S. Appl. No. 11/613,652 dated Oct. 27, 2014.
Notice of Allowance from U.S. Appl. No. 11/613,652 dated Nov. 20, 2014.
Restriction Requirement from U.S. Appl. No. 13/802,918 dated Jan. 14, 2016.
Restriction Requirement from U.S. Appl. No. 13/802,883 dated Jan. 14, 2016.
Office Action from U.S. Appl. No. 13/802,951 dated Nov. 2, 2015.
Amendment from U.S. Appl. No. 13/802,951 dated Mar. 2, 2016.
Restriction Requirement from U.S. Appl. No. 13/802,985 dated Jan. 15, 2016.
Response to Restriction Requirement from U.S. Appl. No. 13/802,985 dated Mar. 11, 2016.
Notice of Non-Compliant Amendment from U.S. Appl. No. 13/802,985 dated Apr. 13, 2016.
Amendment from U.S. Appl. No. 13/802,985 dated Jun. 2, 2016.
Office Action from U.S. Appl. No. 13/802,985 dated Jul. 26, 2016.
Applicant Initiated Interview Summary from U.S. Appl. No. 13/802,985 dated Oct. 17, 2016.
Amendment from U.S. Appl. No. 13/802,985 dated Oct. 26, 2016.
Office Action from U.S. Appl. No. 13/802,985 dated Feb. 8, 2017.
Response to Office Action from U.S. Appl. No. 13/802,985 dated Jun. 8, 2017.
Advisory Action from U.S. Appl. No. 13/802,985 dated Jun. 29, 2017.
Amendment from U.S. Appl. No. 13/802,985 dated Jul. 6, 2017.
Office Action from U.S. Appl. No. 13/803,032 dated Jan. 5, 2016.
Amendment from U.S. Appl. No. 13/803,032 dated May 4, 2016.
Office Action from U.S. Appl. No. 13/803,032 dated Aug. 11, 2016.
Applicant Initiated Interview Summary from U.S. Appl. No. 13/803,032 dated Nov. 2, 2016.
Amendment from U.S. Appl. No. 13/803,032 dated Dec. 7, 2016.
Non-Final Office Action from U.S. Appl. No. 13/803,032 dated Feb. 24, 2017.
Amendment from U.S. Appl. No. 13/803,032 dated Jun. 20, 2017.
Final Office Action from U.S. Appl. No. 13/803,032 dated Oct. 5, 2017.
Restriction Requirement from U.S. Appl. No. 13/803,077 dated Jan. 14, 2016.
Response to Restriction Requirement from U.S. Appl. No. 13/802,918 dated Mar. 11, 2016.
Office Action from U.S. Appl. No. 13/802,918 dated Dec. 16, 2016.
Response to Office Action from U.S. Appl. No. 13/802,918 dated May 9, 2017.

(56) References Cited

OTHER PUBLICATIONS

Final Office Action from U.S. Appl. No. 13/802,918 dated Sep. 8, 2017.
Office Action from U.S. Appl. No. 13/803,077 dated Apr. 21, 2016.
Response to Office Action from U.S. Appl. No. 13/803,077 dated Jul. 14, 2016.
Final Office Action from U.S. Appl. No. 13/803,077 dated Sep. 29, 2016.
Amendment from U.S. Appl. No. 13/803,077 dated Dec. 29, 2016.
Advisory Action from U.S. Appl. No. 13/803,077 dated Jan. 27, 2017.
Amendment from U.S. Appl. No. 13/803,077 dated Jan. 30, 2017.
Final Office Action from U.S. Appl. No. 13/803,077 dated Feb. 23, 2017.
Amendment After Final Office Action from U.S. Appl. No. 13/803,077 dated May 22, 2017.
Advisory Action from U.S. Appl. No. 13/803,077 dated Jun. 15, 2017.
Amendment from U.S. Appl. No. 13/803,077 dated Jun. 20, 2017.
Office Action from U.S. Appl. No. 13/803,077 dated Aug. 7, 2017.
Response to Restriction Requirement from U.S. Appl. No. 13/802,883 dated Mar. 11, 2016.
Office Action from U.S. Appl. No. 13/802,883 dated Jul. 28, 2016.
Applicant Initiated Interview Summary from U.S. Appl. No. 13/802,883 dated Oct. 17, 2016.
Amendment from U.S. Appl. No. 13/802,883 dated Oct. 26, 2016.
Final Office Action from U.S. Appl. No. 13/802,883 dated Feb. 8, 2017.
Response to Final Office Action from U.S. Appl. No. 13/802,883 dated Jun. 8, 2017.
Non-Final Office Action from U.S. Appl. No. 13/802,883 dated Aug. 24, 2017.
Second Office Action from Chinese Application No. 201480027580.1 dated Jan. 3, 2018 (English Translation).
Notice of Allowance from U.S. Appl. No. 13/802,951 dated Dec. 7, 2017.
Office Action from U.S. Appl. No. 13/802,985 dated Nov. 3, 2017.
Amendment from U.S. Appl. No. 13/803,077 dated Dec. 6, 2017.
Response to Office Action from U.S. Appl. No. 13/802,883 dated Jan. 24, 2018.
Amendment from U.S. Appl. No. 13/803,032 dated Mar. 5, 2018.
Applicant Initiated Interview Summary from U.S. Appl. No. 13/803,077 dated Dec. 15, 2017.
Amendment from U.S. Appl. No. 13/802,918 dated Mar. 8, 2018.
Advisory Action from U.S. Appl. No. 13/802,918 dated Mar. 13, 2018.
Office Action from Chinese Application No. 201480049376.X dated Jan. 2, 2018.
Advisory Action from U.S. Appl. No. 13/803,032 dated Apr. 10, 2018.
Amendment from U.S. Appl. No. 13/802,985 dated May 2, 2018.
Applicant Initiated Interview Summary from U.S. Appl. No. 13/802,985 dated May 3, 2018.
Amendment Filed with RCE from U.S. Appl. No. 13/803,032 dated Apr. 4, 2018.
Office Action from Chinese Patent Application No. 201480026618.3 dated Jun. 27, 2018.
Office Action from U.S. Appl. No. 13/802,883 dated Jun. 29, 2018.
Office Action from U.S. Appl. No. 13/803,077 dated May 15, 2018.
Office Action from Chinese Patent Application No. 201480027935.7 dated May 11, 2018.
Amendment from U.S. Appl. No. 13/802,985 dated Dec. 19, 2018.
Applicant Initiated Interview Summary from U.S. Appl. No. 13/802,985 dated Dec. 31, 2018.
Amendment from U.S. Appl. No. 13/803,032 dated Jan. 30, 2019.
Amendment from U.S. Appl. No. 13/802,918 dated Dec. 7, 2018.
Preliminary Amendment from U.S. Appl. No. 16/131,827 dated Dec. 4, 2018.
Office Action from U.S. Appl. No. 13/802,985 dated Apr. 1, 2019.
Applicant Interview Summary from U.S. Appl. No. 13/803,032 dated Feb. 28, 2019.
Office Action from U.S. Appl. No. 13/802,918 dated Mar. 20, 2019.
What is Implementation—definition from whatis.com downloaded Feb. 22, 2019 (5 pages).
Microcontroller—https:/en.wikipedia/microcontroller—downloaded Feb. 22, 2019 (11 pages).
Office Action from U.S. Appl. No. 13/802,883 dated Feb. 8, 2019.
Fourth Office Action from Chinese Application No. 201480027580.1 dated Apr. 15, 2019.
Receive—definition from Dictionary.com downloaded Oct. 21, 2018.
Hoff et al.; "Computer vision-based registration techniques for augmented reality"; Proceedings of Intelligent Robots and Computer Vision XV; SPIE vol. 2904; Dated Nov. 18-22, 1996; pp. 538-548.
Mann, et al.; "Realtime HOR (High Dynamic Range) Video for Eyetap Wearable Computers, FPGA-Based Seeing Aids, and Glasseyes (Eyetaps);" Univ. of Toledo, IEEE Canadian Conf. on Electrical and Computer Eng., 2012; pp. 1-6.
Hillers, et al.; "Augmented Reality—The third way for new technologies in welding education;" GSI SLV Duisburg, Tech. Conf. "Welding Trainer 2010" 08-09; Dated Sep. 2010; pp. 1-4.
Farber; "The next big thing in tech: Augmented reality;" Sci-Tech CNET; Dated Jun. 7, 2013; pp. 1-11.
Stone, et al.; "Full Virtual Reality vs. Integrated Virtual Reality Training in Welding," Supplement to the Welding Journal; Dated Jun. 2013; vol. 92; pp. 167-174-s.
Aiteanu, et al.; "A step forward in manual welding: demonstration of augmented reality helmet" IEEE Xplore Abstract; Accessed Jan. 15, 2016; pp. 1-2.
Tschirner, et al.; "A Concept for the Application of Augmented Reality in Manual Gas Metal Arc Welding;" Proceeding of the international Symposium on Mixed and Augmented Reality (SIMAR'02), IEEE Computer Society,; Dated 2002; pp. 1-2.
Morpha Style Guide compiled by: Kuka Roboter GmbH and Reis GmbH & Co Maschinenfabrik; BMBF Lead Project Anthropomorphe Assisenzsysteme (Morpha); Style Guide for Icon-based Programming; Accessed Mar. 2015; pp. 1-56.
XP-002422858; "Getting Started with LabVIEW Virtual Instruments;" National Instruments Corporation; Accessed Mar., 2015; pp. 1-70.
VJ Technologies; "Vi3 Imaging Software;" Dated May 2011; pp. 1-2.
Edison Welding Institute; "E-Weld Predictor;" Dated 2008; pp. 1-3.
Eduwelding+; "Weld Into the Future;" Online Welding Seminar—A virtual training environment; www.123arc.com; Dated 2005; pp. 1-4.
Eduwelding+; "Training Activities with ARC+ Simulator; Weld Into the Future;" Online Welding Simulator—A virtual training environment; www.123arc.com; Dated May 2008; pp. 1-6.
Joanneum; "Fronius—virtual welding;" Dated May 12, 2008; pp. 1-2.
Heston; "Virtually welding;" thefabricator.com; Dated Mar. 11, 2008; pp. 1-4.
Fast, et al.; "Virtual Training for Welding;" Mixed and Augmented Reality, 2004, ISMAR 2004, Third IEEE and CM International Symposium; Dated Nov. 2-5, 2004; pp. 1-2.
Garcia-Ellende, et al.; "Defect Detection in Arc-Welding Processes by Means of the Line-to-Continuum Method and Feature Selection;" www.mdpi.com/journal/sensors; Sensors 2009, 9, 7753-7770; doi; 10.3390/s91007753; Published Sep. 29, 2009; pp. 7754-7770.
Hillis, et al.; "Data Parallel Algorithms;" Communications of the ACM; vol. 29, No. 12; Dated Dec. 1986; pp. 1170-1183.
Mahrle, et al.; "The influence of fluid flow phenomena on the laser beam welding process;" International Journal of Heat and Fluid Flow 23; Dated 2002; pp. 288-297.
The Lincoln Electric Company; "CheckPoint Production Monitoring brochure;" http://www.lincolnelectric.com/assets/en_US/products/literature/s232_pdf; Publication S2.32; Dated Feb., 2012; pp. 1-4.
The Lincoln Electric Company; "Production Monitoring 2;" Dated May 2009; pp. 1-4.

(56) References Cited

OTHER PUBLICATIONS

Lindholm, et al.; "NVIDIA Testla: A Unifired Graphics and Computing Architecture;" IEEE Computer Society; Dated 2008; pp. 39-55.
Mavrikios, et al.; "A prototype virtual reality-based demonstrator for immersive and interactive simulation of melding processes;" International Journal of Computer Integrated Manufacturing; vol. 19, No. 3; Dated Apr. 1, 2006; pp. 294-300.
Chironis, et al.; "Mechanisms and Mechanical Devices SourceBook;" McGraw Hill; 2nd Addition; Dated 1996; pp. 1-10.
Miller Electric MFG.00.; "MIG Welding System features weld monitoring software;" NewsRoom 2010 (Dialog File 992); copyright 2011 Dialog 2010; http://www.dialogweb.com/cgi/dwclient?reg=1331233430487; Dated Mar. 8, 2012; pp. 1-3.
NSRP ASE; "Low-Cost Virtual Reality Welder Training System;" Dated 2008; p. 1.
N. A. Tech.; "P/NA.3 Process Modeling and Optimization;" Dated Jun. 4, 2008; pp. 1-11.
Porter, et al.; "Virtual Reality Welder Training;" Paper No. 2005-P19; Dated 2005; pp. 1-16.
Schoder; "Design and Implementation of a Video Sensor for Closed Loop Control of Back Bead Weld Puddle Width;" Massachusetts Institute of Technology, Dept. of Mechanical Engineering; Dated May 27, 1983; pp. 1-64.
Lim, et al.; "Automatic classification of weld defects using simulated data and an MLP neutral network;" Insight, vol. 49, No. 3; Dated Mar. 2007; pp. 154-159.
Russell, et al.; "Artificial Intelligence: A Modem Approach;" Prentice-Hall; Copyright 1995; pp. 1-20.
O'Brien; "Google's Project Glass gets some more details;" http://www.engadget.com/2012/06/27/googles-project-glass-gets-some-more-details/, Dated Jun. 27, 2012; pp. 1-4.
Dotson; "Augmented Reality Welding Helmet Prototypes How Awesome the Technology Can Get;" http://siliconangle.com/blog/2012/09/26/augmented-reality-welding-helmet-prototypes-how-awesome-the-technology-can-get/, Dated Sep. 26, 2012; pp. 1-3.
Yao, et al.; "Development of a Robot System for Pipe Welding;" 2010 International Conference on Measuring Technology and Mechatronics Automation; http://ieeexplore.ieee.org/stamp/stamp.jsp?tp=&arnumber=5460347&tag=1; Dated 2010; pp. 1109-1112.
Hirche, et al.; "Hardware Accelerated Per-Pixel Displacement Mapping;" Proceedings of Graphics Interface; Dated May 17, 2004; pp. 1-8.
Balijepalli, et al.; "A Haptic Based Virtual Grinding Tool;" Proceedings of the 11th Symposium on Haptic Interfaces for Virtual Environment and Teleoperator Systems; Dated Jul. 2003; pp. 1-7.
Veiga; "Simulation of a Work Cell in the IGRIP Program;" Master's Thesis; Master of Science Programme, Mechanical Engineering; Luleå University of Technology; Dated Apr. 2006; pp. 1-50.
Jonsson, et al.; "Simulation of Tack Welding Procedures in Butt Joint Welding of Plates;" Welding Research Supplement; Dated Oct. 1985; pp. 296-s-302-s.
Reeves; "Particles Systems—A Technique for Modeling a Class of Fuzzy Objects;" Computer Graphics; vol. 17, No. 3; Dated Jul. 1983; pp. 359-376.
Graham; "Texture Mapping;" Carnegie Mellon University; Class 15-462 Computer Graphics; Lecture 10; Dated Feb. 13, 2003; pp. 1-53.
Hu, et al.; "Heat and mass transfer in gas metal arc welding. Part 1: The arc;" http://www.web.mst.eduHsai/publications/HU-IJHMT-2007-1-60.pdf; International Journal of Heat and Mass Transfer; vol. 50 (2007); Dated Oct. 24, 2006; pp. 833-846.
Miller Electric MFG. Co.; "LiveArc Welding Performance Management System;" Product Brochure; Dated Dec. 2014; pp. 1-4.
Miller Electric MFG. Co.; "LiveArc: Welding Performance Management System;" Owner's Manual; Dated Jul. 2014; pp. 1-64.
The Lincoln Electric Company, "VRTEX Virtual Reality Arc Welding Trainer," http://www.lincolnelectric.com/en-us/equipment/training-equipment/Pages/vrtex.aspx; Accessed Jul. 10, 2015; pp. 1-3.
Wuhan ONEW Technology Co. Ltd.; "ONEW-360 Welding Training Simulator;" http://en.onew1ech.com/_d276479751.htm; Accessed Jul. 10, 2015; pp. 1-12.
Lincoln Global, Inc.; "VRTEX 360: Virtual Reality Arc Welding Trainer;" Product Brochure; Dated 2015; pp. 1-4.
United States Provisional Patent Application for "System for Characterizing Manual Welding Operations on Pipe and ODther Curved Structures;" U.S. Appl. No. 62/055,724, filed Sep. 26, 2014; p. 1-35.
Praxaire Technology, Inc.; "The RealWeld Trainer System: Real Weld Training Under Real Conditions;" Product Brochure; Dated 2013; pp. 1-2.
Antonelli, et al.; "A Semi-Automated Welding Station Exploiting Human-Robot Interaction;" Advanced Manufacturing Systems and Technology; Dated Jun. 2011; pp. 249-260.
chemweb.com; "Journal of Materials Engineering and Performance (v.7, #5);" Printed Sep. 26, 2012; pp. 1-3.
VRSim; "SimWelder;" http://www.simwelder.com; Retrieved on Apr. 12, 2010; pp. 1-2.
SIMFOR/CESOL; ""RV-Sold" Welding Simulator;" Accessed on Apr. 26, 2013; pp. 1-20.
Wade; "Human uses of ultrasound: ancient and modern;" Ultrasonics, vol. 38; Dated 2000; pp. 1-5.
Wang, et al.; "Numerical Analysis of Metal Transfer in Gas Metal Arc Welding under Modified Pulsed Current Conditions;" Metallurgical and Material Transactions B; vol. 35B; Dated Oct. 2004; pp. 857-865.
Wang et al.; "Study on Welder Training by Means of Haptic Guidance and Virtual Reality for Arc Welding;" Proceedings of the 2006 IEEE International Conference on Robotics and Biomimetics; Dated Dec. 17, 2006; pp. 954-958.
White, et al.; "Virtual Welder Trainer;" IEEE Virtual Reality Conference; Dated 2009; pp. 303, 2009.
International Search Report and Written Opinion from PCT/IB09/000605 dated Feb. 12, 2010.
Desroches; "Code-Aster: Note of use for calculations of welding;" Instruction Manual U2.03 Booklet: Thermomechanical; Document: U2.03.05; Dated Oct. 1, 2003; pp. 1-13.
ASME; "ASME Definitions, Consumables, Welding Positions;" http://www.gowelding.com/wp/asme4.htm; Dated Mar. 19, 2001; pp. 1-3.
Abbas, et al.; "Code_Aster: Introduction to Code_Aster;" User Manual; Booket U1 .0-: Introduction to Code_Aster; Document: U1 .02.00; Version 7.4; Dated Jul. 22, 2005; pp. 1-14.
Agren; "Sensor Integration for Robotic Arc Welding;" Lunds Universitet, vol. 5604C of Dissertations Abstracts International; Dated 1995; Printed Mar. 8, 2012; p. 1123.
Abid, et al.; "Numerical simulation to study the effect of tack welds and root gap on welding deformations and residual stresses of a pipe-flange joint" International Journal of Pressure Vessels and Piping 82 (2005); Dated Aug. 25, 2005; pp. 860-871.
Aidun, et al.; "Penetration in Spot GTA Welds during Centrifugation;" Journal of Materials Engineering and Performance; vol. 7(5); Dated Oct. 1998; pp. 597-600.
ARS Electronica; "Fronius: High-speed video technology is applied to research on welding equipment, and the results are visualized in the Cave;" Dated May 18, 1997; pp. 1-2.
Asciencetutor.Com; "VWL (Virtual Welding Lab);" Dated 2007; pp. 1-2.
Borzecki, et al.; "Specialist Committee V.3: Fabrication Technology;" 16th International Ship and Offshore Structures Congress; vol. 2; Dated Aug. 20, 2006; pp. 115-163.
CS Wave; "The Virtual Welding Trainer;" Dated 2007; pp. 1-6.
Da Dalto, et al.; "CS Wave: A Virtual learning tool for welding motion;" Dated Mar. 14, 2008; pp. 1-10.
Choquet; "ARC+: Today's Virtual Reality Solution for Welders;" 123 Certification Inc.; Dated Jan. 1, 2008; pp. 1-6.
EWI; "Virtual Reality Welder Training;" Cooperative Research Program; Summary Report SR 0512; Dated Jul. 19, 2005; pp. 1-4.
International Search Report and Written Opinion from PCT/IB10/02913 dated Apr. 19, 2011.
Guu, et al.; "Technique for Simultaneous Real-Time Measurements of Weld Pool Surface Geometry and Arc Force;" Welding Research Supplement; Dated Dec. 1992; pp. 473-s-482-s.

(56) References Cited

OTHER PUBLICATIONS

Chen, et al.; "Self-Learning Fuzzy Neural Networks and Computer Vision for Control of Pulsed GTAW;" Welding Research Supplement; Dated May 1997; pp. 201-s-209-s.
Rodjito; "Position tracking and motion prediction using Fuzzy Logic;" Colby College; Honors Thesis: Department of computer Science; Paper 520; Dated 2006; pp. 1-81.
D'Huart, et al.; "Virtual Environment for Training;" 6th International Conference, ITS 20002; Dated Jun. 2002; pp. 1-6.
Nasios; "Improving Chemical Plant Safety Training Using Virtual Reality;" University of Nottingham, School of Chemical, Environmental, and Mining Engineering; Dated Dec. 2001; pp. 1-313.
Porter, et al.; "Virtual Reality Welder Training;" Session 5: Joining Technologies for Naval Applications; Dated Jul. 14, 2006; pp. 1-29.
Mantinband, et al.; "Autosteroscopic, field-sequential display with full freedom of movement or Let the display were the shutter-glasses!;" Proceedings of SPIE, vol. 4660; Dated 2002; pp. 246-253.
Vizitech USA; "Changing the Way America Learns;" http://vizitechusa.com/; Retrieved on Mar. 27, 2014; pp. 1-2.
Cayo, et al.; "A Non-Intrusive GMA Welding Process Quality Monitoring System Using Acoustic Sensing;" Sensors, vol. 9; Dated Sep. 9, 2009; pp. 7150-7166.
Wu; "Microcomputer-based welder training simulator;" Computers in Industry 20; Dated 1992; pp. 321-325.
Teeravarunyou, et al.; "Computer Based Welding Training System;" International Journal of Industrial Engineering, 16(2); Dated Jan. 19, 2009; pp. 116-125.
Office Action from U.S. Appl. No. 13/803,032 dated May 30, 2019.
Appeal Brief from U.S. Appl. No. 13/802,883 dated Jul. 8, 2019.
Amendment from U.S. Appl. No. 13/802,918 dated Jun. 19, 2019.
Notice of Appeal from U.S. Appl. No. 13/802,918 dated Jun. 20, 2019.
Appeal Brief from U.S. Appl. No. 13/802,918 dated Aug. 20, 2019.

\* cited by examiner

WELDING JOB SEQUENCER

CROSS REFERENCE TO RELATED APPLICATION

This application is a continuation of U.S. patent application Ser. No. 11/613,652, filed Dec. 20, 2006, titled "Welding Job Sequencer," now allowed, which is incorporated herein by reference in its entirety.

BACKGROUND OF THE INVENTION

1. Field of the Invention

Devices, systems, and methods consistent with the invention relate to semi-automatic welding work cells.

2. Description of the Related Art

In the related art, work cells are used to produce welds or welded parts. There are at least two broad categories of work cells, including robotic work cells and semi-automatic work cells.

In robotic work cells, the scheduling and performing of welding operations is largely automated, with little operator involvement. Thus, these cells generally have a relatively low labor cost and a relatively high productivity. However, their repeating operations cannot easily adapt to varying welding conditions and/or sequences.

In contrast, semi-automatic work cells (i.e., work cells involving at least some operator welding) generally provide less automation vis-à-vis robotic work cells, and accordingly have a relatively higher labor cost and a relatively lower productivity. Nevertheless, there are many instances where using a semi-automatic welding work cell can actually be advantageous over robotic work cells. For example, a semi-automatic welding work cell can more easily adapt to varying welding conditions and/or sequences.

Unfortunately, when welding more complex assemblies in related art semi-automatic work cells, multiple different welding schedules are often required for different types of welds on different parts of an assembly. In many systems, when a different welding schedule must be utilized, the operator is required to stop welding operations and manually adjust the output of the semi-automatic equipment according to the new schedule. In some other systems, this manual adjustment is eliminated by storing particular schedules in the work cell. Nevertheless, even in such systems, the operator still needs to cease welding operations and push a button to select the new welding schedule before he may continue welding.

Neither of these practices for setting a different welding schedule is particularly efficient. Thus, in practice, the number of welding schedules used in a semi-automatic work cell is often reduced in order to eliminate the need for constant adjustment of the output of the semi-automatic equipment. While this reduction of welding schedules makes the overall operation easier for the welder, the forced simplification of this approach can lead to reduced productivity and lower overall quality.

Additionally, when abiding by strict quality control specifications, it is sometimes necessary to perform welds in a specific sequence, verify that each weld is performed with a given set of conditions, and monitor the output of the equipment during the welding operations. In a robotic work cell, these requirements are easily fulfilled. However, in a semi-automatic work cell, these requirements are susceptible to human error, since the operator must keep track of all of these aspects in addition to performing the welding operations themselves.

An illustrative example of the above problems is shown in the related art semi-automatic welding method diagrammatically represented in FIG. 1. In this method, each of the various scheduling, sequencing, inspection and welding operations are organized and performed by the operator (i.e., the welder) himself. Specifically, the operator begins the welding job at operation 10. Then, the operator sets up the welding equipment according to schedule A, at operation 20. Next, the operator performs weld #1, weld #2, and weld #3 using welding schedule A at operations 22, 24 and 26. Then, the operator stops welding operations and sets up the welding equipment according to schedule B at operation 30. Next, the operator performs weld #4 using welding schedule B at operation 32. Then, the operator checks the dimensions of the assembly at operation 40, and sets up the welding equipment according to schedule C at operation 50. Next, the operator performs weld #5 and weld #6 using welding schedule C at operations 52 and 54. After the welding operations are completed, the operator visually inspects the welded assembly at operation 60, and completes the welding job at operation 70.

Clearly, the method shown in FIG. 1 depends on the operator to correctly follow the predefined sequencing for performing welds and inspections, to accurately change between welding schedules (such as at operation 30), and to perform the welding itself. Errors in any of these responsibilities can result either in rework (if the errors are caught during inspection at operation 60) or a defective part being supplied to the end user. Further, this exemplary semi-automatic welding method hampers productivity, because the operator must spend time configuring and reconfiguring weld schedules.

The above problems demand an improvement in the related art system.

BRIEF SUMMARY OF THE INVENTION

According to an aspect of the invention, there is provided a semi-automatic welding work cell including a welding job sequencer that automatically selects a welding schedule for use by an operator in the semi-automatic welding work cell.

According to another aspect of the invention, there is provided a method of welding in a semi-automatic work cell, including automatically selecting a welding schedule for use by an operator in the semi-automatic welding work cell.

According to another aspect of the invention, there is provided a welding production line including at least one semi-automatic welding work cell, where the semi-automatic work cell includes a welding job sequencer that automatically selects a welding schedule for use by an operator therein.

According to another aspect of the invention, there is provided a method of monitoring a welding production line, including automatically selecting a welding schedule for use by an operator in a semi-automatic welding work cell.

The above stated aspect, as well as other aspects, features and advantages of the invention will become clear to those skilled in the art upon review of the following description.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
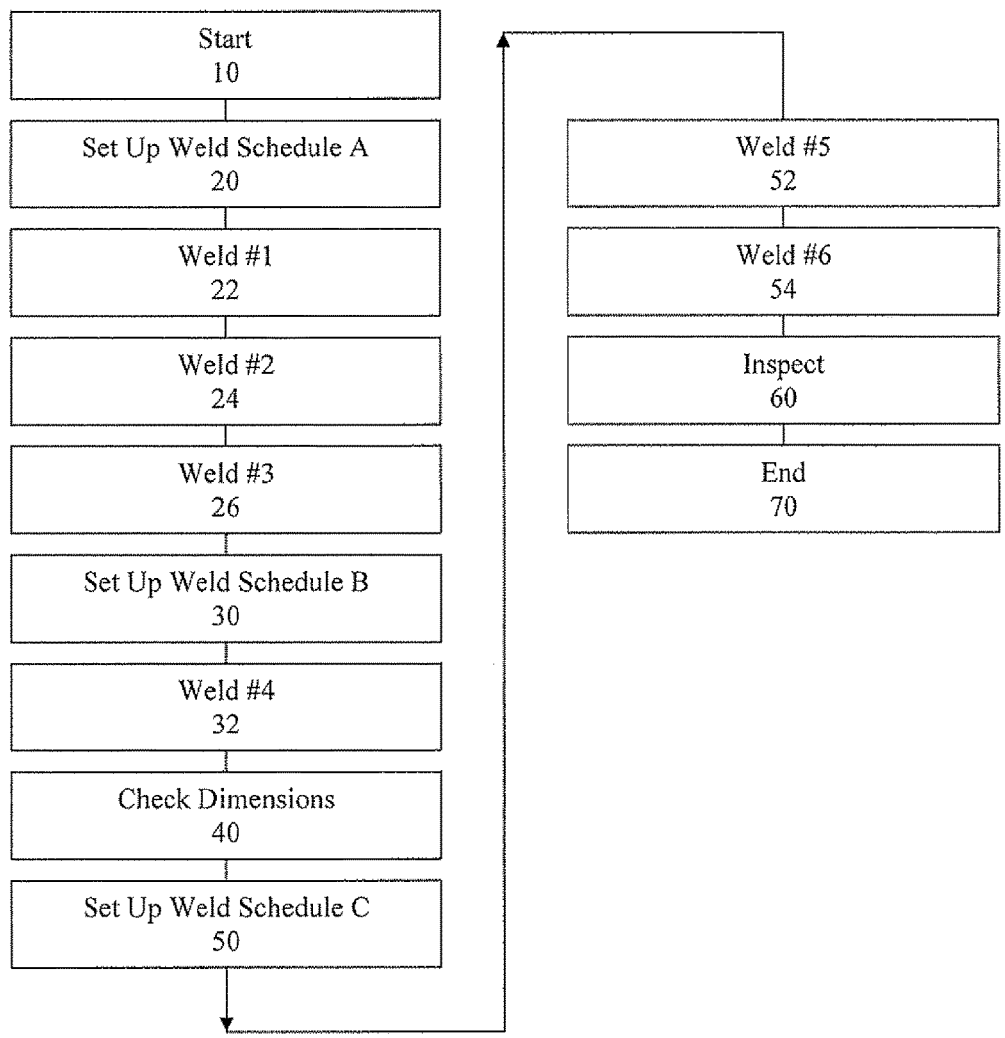
FIG. 1 illustrates a welding operation of the related art utilizing a semi-automatic welding work cell.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

In an exemplary embodiment of the invention, a welding job sequencer is provided. The welding job sequencer improves the semi-automatic work cell of the related art by increasing the productivity of the semi-automatic work cell without compromising the number of weld schedules usable therein. The welding job sequencer accomplishes this improvement by implementing automatic changes in the semi-automatic work cell, and by providing the operator with an array of commands and instructions.

More specifically, in an exemplary embodiment, the welding job sequencer automatically selects and implements a function of the welding work cell. An example of such a function includes a particular weld schedule to be used with the semi-automatic work cell. In other words, the welding job sequencer may select a weld schedule to be used for a particular weld, and modify the settings of the semi-automatic work cell in accordance with the selected weld schedule, automatically for the operator (i.e., without the operator's specific intervention).

Additionally, in the exemplary embodiment, the welding job sequencer may automatically indicate a sequence of operations that the operator should follow to create a final welded assembly. In conjunction with the automatic selection of welding schedules, this indicated sequence allows an operator to follow the sequence to create a final welded part, without having to spend time adjusting, selecting, or reviewing each individual weld schedule and/or sequence.

Accordingly, since the welding job sequencer sets up the welding equipment and organizes the workflow, and since the operator only performs the welding operations themselves, the chance for error in the welding operation is greatly reduced, and productivity and quality are improved.

Figure 2:
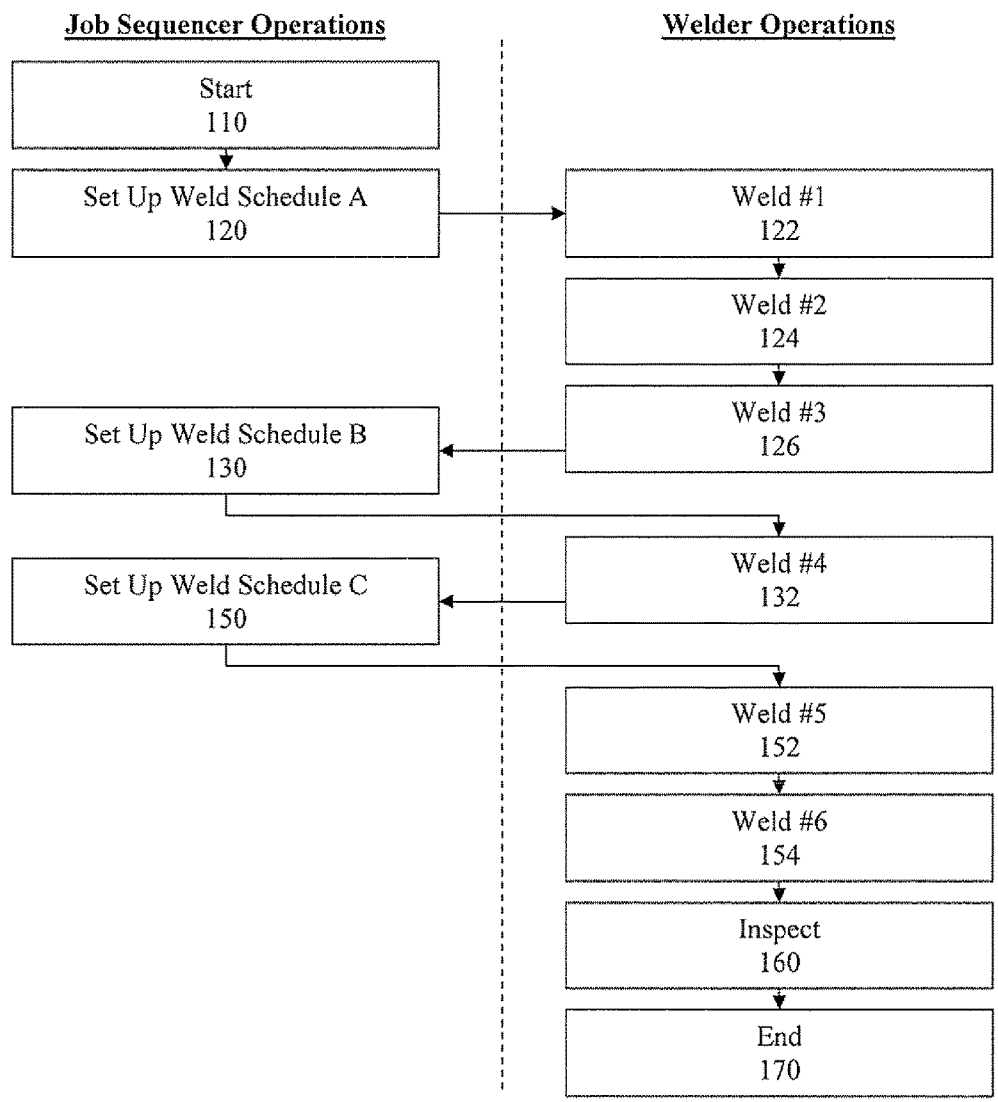
FIG. 2 illustrates a welding operation according to the invention utilizing a semi-automatic welding work cell.

The exemplary embodiment is diagrammatically represented in FIG. 2. In FIG. 2, at operation 110, the welding job sequencer begins operation, and immediately sets the welding equipment to use weld schedule A (operation 120) and instructs the operator to perform welds #1, #2 and #3. Then, the operator performs welds #1, #2 and #3 using weld schedule A (operations 122, 124 and 126). Next, the welding job sequencer sets the welding equipment to use weld schedule B (operation 130), and instructs the operator to perform weld #4. Then the operator performs weld #4 using weld schedule B (operations 132). After completion of weld schedule B, the welding job sequencer sets the welding equipment to use weld schedule C (operation 150), and instructs the operator to perform welds #5 and #6, and to inspect the part. Then, the operator performs welds #5 and #6 (operations 152, and 154) using weld schedule C, and inspects the completed part to confirm that it is correct (operation 160). This inspection may include dimensional verification, visual defect confirmation, or any other type of check that might be needed. Further, operation 160 may include a requirement that the operator affirmatively indicate that the inspection is complete, such as by pressing an "OK" button, before it is possible to proceed to the next operation.

Lastly, the welding job sequencer indicates that the welding operation is at an end (operation 170), and re-sets for the next operation.

Accordingly, as noted above, the sequencing and scheduling of welding operations is completed by the sequencer, and frees the operator to focus on performing welds according to instruction.

The welding job sequencer may select and implement a new function, such as the selection and implementation of weld schedules A, B and C shown in FIG. 2, based upon various variables or inputs. For example, the welding job sequencer may simply select new weld schedules based upon a monitoring of elapsed time since the beginning of the welding operations, or since the cessation of welding (such as the time after weld #3 in FIG. 2 above). Alternatively, the welding job sequencer may monitor the actions of the operator, compare the actions to the identified sequence of welds, and select new weld schedules appropriately. Still further, various combinations of these methods, or any other effective method, may be implemented, as long as the end effect is to provide an automatic selection and implementation of a function, such as the weld schedule, for use by the operator.

Parameters of the selected weld schedule may include such variables as welding process, wire type, wire size, WFS, volts, trim, which wire feeder to use, or which feed head to use, but are not limited thereto.

While the above description focuses on the selection of a weld schedule as a function which is automatically selected and implemented, the welding job sequencer is not limited to using only this function.

For example, another possible function that may be selected and implemented by the welding job sequencer is a selection of one of multiple wire feeders on a single power source in accordance with the weld schedule. This function provides an even greater variability in welding jobs capable of being performed by the operator in the semi-automatic work cell, since different wire feeders can provide a great variance of, for example, wire sizes and types.

Another example of a function compatible with the welding job sequencer is a Quality Check function. This function performs a quality check of the weld (either during welding or after the weld is completed) before allowing the job sequence to continue. The quality check can monitor various welding parameters and can pause the welding operation and alert the operator if an abnormality is detected. An example of a welding parameter measurable by this function would be arc data.

Another example of such a function would be a Repeat function. This function would instruct the operator to repeat a particular weld or weld sequence. An example of the use of this function includes when the Quality Check function shows an abnormality, or when multiple instances of the same weld are required.

Another example of such a function would be a Notify Welder function, which communicates information to the welder. This function would display information, give an audible signal, or communicate with the welder by some other means. Examples of use of this function include an indication to the operator that he is free to begin welding, or an indication that the operator should check some portion of the welded part for quality purposes.

Another example of such a function would be a Enter Job Information function. This function will require the welder to enter information, such as the part serial number, a personal ID number, or other special conditions before the job sequencer can continue. This information could also be read from a part or inventory tag itself through RFID, bar code scanning, or the like. The welding job sequencer could then utilize the entered information for the welding operations. An example of the use of this function would be as a predicate to the entire welding operation, so as to indicate to the welding job sequencer which schedules and/or sequences should be selected.

A further example of such a function would be a Job Report function. This function will create a report on the welding job, which could include information such as: the number of welds performed, total and individual arc timing, sequence interruptions, errors, faults, wire usage, arc data, and the like. An example of the use of this function would be to report to a manufacturing quality department on the efficiency and quality of the welding processes.

A still further example of such a function would be a System Check function. This function will establish whether the welding job can continue, and could monitor such parameters as wire supply, gas supply, time left in the shift (as compared to the required time to finish the job), and the like. The function could then determine whether the parameters indicate that there is enough time and/or material for the welding job to continue. This function would prevent down-time due to material depletion, and would prevent work-in-process assemblies from being delayed, which can lead to quality problems due to thermal and scheduling issues.

Further, as mentioned above, the welding job sequencer may select and implement a new function, based upon various variables or inputs. These variables and inputs are not particularly limited, and can even be another function. For example, another function compatible with the welding job sequencer is a Perform Welding Operation function. This function is designed to detect the actual welding performed by the operator, and to report that welding so that the welding job sequencer can determine whether to proceed with further operations. For example, this function can operate by starting when the operator pulls the trigger to start the welding operation, and finishing when the operator releases the trigger after the welding is complete, or after a predetermined period of time after it starts. This function could end when the trigger is released or it could be configured to automatically turn off after a period of time, a quantity of wire, or an amount of energy is delivered. This function may be used to determine when to select a new function, such as a new weld schedule, as discussed above.

Still further, various semi-automatic and/or robotic work cells can be integrated together on a single network, and the sequencing of welding steps at a single work-cell can be fully integrated into a complete production schedule, which itself can be modified as needed to track variations in the production schedule. Sequencing and/or scheduling information can also be stored in a database, be stored by date as archival information, and be accessed to provide various production reports.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:

1. A semi-automatic welding work cell for welding an assembly defined by a plurality of welds, the plurality of welds being defined by at least two weld schedules, the semi-automatic welding work cell comprising: welding equipment for use by a welding operator to perform said plurality of welds and complete the assembly during a semi-automatic welding operation, said welding equipment having a plurality of functions; and a welding job sequencer which selects and implements at least one of the plurality of functions to define at least a first weld schedule and a second weld schedule from the at least two weld schedules so as to organize a sequence of operations for creating the welded assembly, said first weld schedule contains at least one first weld set up parameter and at least one first weld instruction for said welding operator and said second weld schedule contains at least one second weld set up parameter and at least one second weld instruction for said welding operator, at least one of said first weld set up parameter and said first weld instruction is different from said second weld set up parameter and said second weld instruction, said welding job sequencer automatically modifying said welding equipment in accordance with said sequence of operations between the first weld schedule and the second weld schedule without said welding operator intervention for completing the welded assembly, with said welding operator performing said semi-automatic welding operation after said welding job sequencer automatically modifies said welding equipment in accordance with said sequence of operations based on said first and second weld schedules.

2. The semi-automatic welding work cell of claim 1, wherein the second weld schedule is defined according to an elapsed time of the first weld schedule.

3. The semi-automatic welding work cell of claim 1, wherein the at least one function detects completion of said first weld schedule by said operator and automatically changes from said first weld schedule to said second weld schedule.

4. The semi-automatic welding work cell of claim 1, wherein the at least one function detects when the operator is conducting said first weld schedule, and said second weld schedule is defined according to an amount of welding wire supplied for said first weld schedule.

5. The semi-automatic welding work cell of claim 1, wherein the at least one function detects when the operator is conducting said first weld schedule, and said second weld schedule is defined according to an amount of energy supplied for said first weld schedule.

6. The semi-automatic welding work cell of claim 1, wherein said at least one first weld set up parameter and said at least one second weld set up parameter comprise at least one of a welding process, wire type, wire size, WFS, volts, trim, wire feeder to use, or feed head to use.

7. The semi-automatic welding work cell of claim 1, wherein the said at least first and second weld schedules include a sequence of said at least one first weld instruction and a sequence of said at least one second weld instruction.

8. The semi-automatic welding work cell of claim 1, wherein the at least one function monitors quality measurables of said weld assembly, wherein the quality measurables comprise at least information about an arc used to form the weld created by the operator.

9. The semi-automatic welding work cell of claim 1, wherein the at least one function indicates information to the operator in the semi-automatic welding work cell.

10. The semi-automatic welding work cell of claim 1, wherein the at least one function accepts job information comprising at least a part ID number, operator ID number, or welding instructions.

11. The semi-automatic welding work cell of claim 1, wherein the at least one function produces a job report comprising at least one of a number of welds preformed, total arc time, individual arc time, sequence interruptions, errors, faults, wire usage, arc data.

12. The semi-automatic welding work cell of claim 1, wherein the at least one function includes a system check of said cell, the system check comprising at least a detection of wire supply, gas supply, and time.

13. The semi-automatic welding work cell of claim 1, wherein the welding job sequencer is configured to implement a quality check function into the sequence of operations, wherein the quality check function performs a quality check of at least one of said plurality of welds.

14. The semi-automatic welding work cell of claim 1, wherein the welding job sequencer is configured to implement a repeat function into the sequence of operations, wherein the repeat function instructs the welding operator to repeat one of said plurality of welds.

15. The semi-automatic welding work cell of claim 1, wherein the welding job sequencer is configured to implement a notify welder function into the sequence of operations, wherein the notify welder communicates information to the welding operator.

16. The semi-automatic welding work cell of claim 1, wherein the welding job sequencer is configured to implement an enter job information function into the sequence of operations, wherein the enter job information function requires the welding operator to enter information before the sequence of operations can continue.

17. The semi-automatic welding work cell of claim 1, wherein the welding job sequencer is configured to implement a job report function into the sequence of operations, wherein the job report function creates a report on the welding operation.

18. The semi-automatic welding work cell of claim 1, wherein the welding job sequencer is configured to implement a system check function into the sequence of operations, wherein the system check function determines whether the welding operation can continue.

19. The semi-automatic welding work cell of claim 1, wherein the welding job sequencer is configured to implement a perform welding operation function into the sequence of operations, wherein the perform welding operation function detects actual welding performed by the welding operator.

20. The semi-automatic welding work cell of claim 7, wherein the welding job sequencer includes an indicator of said sequence to the operator.

21. The semi-automatic welding work cell of claim 6, wherein said at least one first weld set up parameter and said at least one second weld set up parameter comprise a wire feeder for use by an operator in the semi-automatic welding work cell.

22. The semi-automatic welding work cell of claim 13, wherein the quality check function pauses the sequence of operations and alerts the welding operator if an abnormality is detected.

23. The semi-automatic welding work cell of claim 14, wherein the repeat function is implemented in response to a quality check of the weld.

24. The semi-automatic welding work cell of claim 15, wherein the notify welder function instructs the welding operator to check one of said plurality of welds.

25. The semi-automatic welding work cell of claim 16, wherein the entered information identifies a part or the welded assembly.

26. The semi-automatic welding work cell of claim 16, wherein the entered information is used to organize the sequence of operations for creating the welded assembly.

27. The semi-automatic welding work cell of claim 17, wherein the report includes at least one of efficiency and quality information.

28. The semi-automatic welding work cell of claim 18, wherein the system check function determines whether the welding operation can proceed based on at least one of a time and a material level necessary to complete the welding operation.

29. A welding production line comprising: at least one semi-automatic welding work cell for welding an assembly defined by a plurality of welds, the plurality of welds being defined by at least two weld schedules, the semi-automatic welding work cell including welding equipment for use by a welding operator to perform the plurality of welds and complete the assembly during a semi-automatic welding operation, the welding equipment having a plurality of functions; and a welding job sequencer which selects and implements at least one of the plurality of functions to define at least a first and a second weld schedule from the at least two weld schedules to organize a sequence of operations for completing the weld assembly, said first weld schedule contains at least one first weld set up parameter and at least one first weld instruction for said welding operator and said second weld schedule contains at least one second weld set up parameter and at least one second weld instruction for said welding operator, at least one of said first weld set up parameter and said first weld instruction is different from said second weld set up parameter and said second weld instruction, said welding job sequencer automatically modifying said welding equipment in accordance with said sequence of operations between the first weld schedule and the second weld schedule without said welding operator intervention for completing the assembly, with said welding operator performing said semi automatic welding operation after said welding job sequencer automatically modifies said welding equipment in accordance with said sequence of operations based on said first and second weld schedules.

30. The welding production line of claim 29, further comprising a monitoring system in communication with the welding job sequencer to monitor completion of the at least one weld instruction of each of the first and second weld schedule.

31. A semi-automatic welding work cell for use by an operator, comprising: welding equipment having a plurality of functions for performing welds by the operator during a semi-automatic welding operation; and a welding job sequencer selecting from the plurality of functions to set up and organize the welding equipment for the operator without operator intervention according to a sequence of operations, the plurality of functions including: a weld schedule function defining at least one weld operation; a notify function to instruct the operator to perform the weld schedule; and a quality check function to monitor at least one weld operation; wherein said welding job sequencer automatically modifies said welding equipment in accordance with said sequence of operations before the at least one weld operation without said operator intervention, with said operator performing said semi-automatic welding operation after said welding job sequencer automatically modifies said welding equipment in accordance with said sequence of operations based on said plurality of functions.

32. The semi-automatic welding work cell of claim 31, wherein the quality check function performs a quality check on a weld completed by the at least one weld operation.

33. The semi-automatic welding work cell of claim 31, wherein the quality check function monitors the at least one weld operation during the at least one weld operation.

34. The semi-automatic welding work cell of claim 31, wherein the quality check function monitors the at least one weld operation after completion of the at least one weld operation.

35. The semi-automatic welding work cell of claim 31, wherein the weld schedule function defines a plurality of weld schedules, each weld schedule having a first weld operation and at least a second weld operation.

36. The semi-automatic welding work cell of claim 31, wherein the quality check function monitors the at least one weld operation before allowing the sequence of operations to continue.

37. The semi-automatic welding work cell of claim 31, wherein when the quality check function detects an abnormality, the sequencer pauses the sequence of operations and the notify function alerts the operator of the abnormality.

* * * * *